Patented Aug. 1, 1944

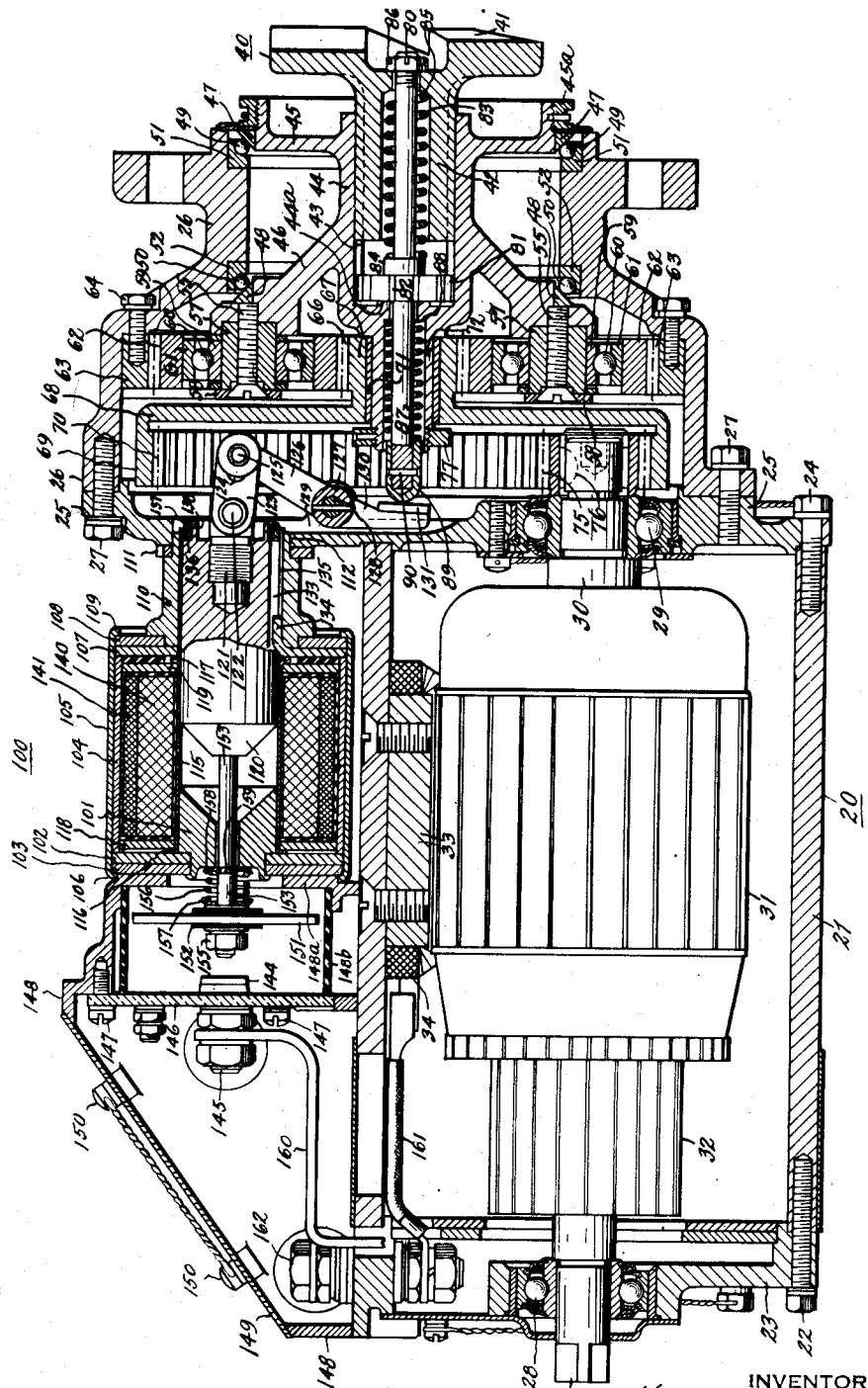

2,354,844

UNITED STATES PATENT OFFICE 2,354,844

ENGINE STARTER

Herbal A. Thornburg, Anderson, Ind., assignor to General Motors Corporation, Detroit, Mich., a corporation of Delaware Application January 9, 1942, Serial No. 426,181

3 Claims. (Cl. 74—6)

This invention relates to apparatus for starting internal combustion engines and has among its objects the provision of improved starter unit comprising an electric motor, a switch for connecting the motor with a current source, a rotatable member driven by the electric motor and moving axially into engagement with a rotatable member of the engine to be started, torque multiplying and speed reducing gearing between the shaft of the electric motor and said shiftable member and an electromagnet for moving said shiftable member and for closing the starting motor switch.

Further objects and advantages of the present invention will be apparent from the following description, reference being had to the accompanying drawing wherein a preferred embodiment of the present invention is clearly shown.

The figure of the drawing is a longitudinal sectional view of an engine starter unit embodying the present invention.

In the drawing, the starting motor 20 comprises a field frame 21 attached by screws 22 to an end frame 23 and by screws 24 to an end frame 25 to which a gear housing 26 is attached by screws 27. The end frames 23 and 25 support ball bearings 28 and 29 respectively for rotatably supporting the motor armature shaft 30 carrying an armature 31 and a commutator 32 engaged by brushes not shown. The armature 31 rotates in a field provided by a plurality of pole pieces 33 surrounded by field windings 34 which are in series with the windings of the armature.

The member which connects the starting motor with a rotatable part of the engine to be started is the axially shiftable driving member 40 providing a jaw clutch element 41 for engagement with a similar jaw clutch element provided by a shaft of the engine to be started. Member 40 includes a tubular hub 42 splinedly connected at 43 with a tubular shaft 44 provided with flanges 45 and 46 which support inner bearing races 47 and 48 of ball bearings 49 and 50 respectively, the outer races 51 and 52 of which are supported by the housing 26. Races 47 and 48 are tightened against balls 49 and 50, respectively by turning a nut 45a threadedly engaging flange 45 of shaft 44. Thus the connecting member 40 and its supporting and driving shaft 44 are rotatably supported by the frame 26.

Screws 55 secured to the flange 46 of shaft 44, blocks 57 and washers 58 which support the inner races 59 of ball bearings 60 whose outer races 61 support planet gears 62 meshing with a stationary ring gear 63 secured by screw 64 to housing 26. The planet gears 62 also mesh with a sungear 66 provided by the hub 67 of a disc 68 having a flange 69 providing an internal gear 70. The hub 67 is provided with a bearing sleeve 71 journalled on the extension 72 of the shaft 44. Internal gear 70 meshes with a gear 75 attached by a key 76 to the armature shaft 30. A nut 77 which is screwed onto the left end of the shaft 44 retains the hub 67 of the disc 68 upon the shaft extension 72. Thus the motor armature shaft 30 is drivingly connected with the axially shiftable driving member 40.

The means for shifting the member 40 includes a rod 80 which extends through the shaft 44 and the member 40. Intermediate its ends the rod 80 is attached to a disc 81 which is provided with longitudinal grooves 82 engaging the splines 43 of the shaft 44. Therefore the disc 81 and the rod 80 are connected with the shaft 44 so as to rotate therewith. A spring 83 is located between the hub 84 of disc 81 and an internal shoulder 85 of the member 40 thereby urging the member 40 toward the right until it engages a nut 86 screwed upon the right end of the rod 80. The rod 80 is urged toward the left by a spring 87 located between an internal shoulder 88 of the shaft 44 and a thimble 89 mounted on the left end of rod 80 and secured by a pin 90. Thus the spring 87 operates to move the rod 80 toward the left until the disc 81 engages the internal shoulder 44a of shaft 44. The normal location of the member 40 is determined by the adjustment of the nut 86 on the right end of the shaft 80. When the rod 80 is moved toward the right, the jaw clutch 41 will be caused to engage a companion jaw clutch on the shaft of the engine to be started. Then the motor 20 is caused to operate to turn the member 40 in order to crank the engine. When the engine becomes self-operative the jaw clutch on the engine part will run ahead of the jaw clutch 41 thereby causing clutch 41 to move intermittently toward the left against the action of spring 83 until the shaft 80 is returned to its normal position.

The starter unit includes an electromagnet 100 for actuating a switch which connects the starting motor with a current source and for causing movement of the rod 80 toward the right. This electromagnet comprises a magnetizable frame which includes a stationary core 101 having its shank riveted to magnetizable discs 102 and 103. Disc 102 bears against a magnetizable tube 104 within a magnetizable tube or outer shell 105 which overlies both discs 102 and 103 and has a flange 106 formed against the left face of disc 103. The shell 105 overlies the periphery of magnetizable discs 107 and 108. A flange 109 of the shell 105 is formed against the right face of disc 108. Disc 108 is centrally apertured to receive a magnetizable sleeve 110 support having its right end portion extending through a centrally apertured plate 111 and a hole 112 in the end frame 25. The sleeve 110 is press-fitted through the plate 111 which is secured by screws not shown to the frame 25. The core 101 and the sleeve 110 together support a nonmagnetizable tube 115 having a left end flange 116 and an intermediate flange or bead 117. Flange 116 spaces the disc 102 from a magnetizable disc 118 which is in contact with the tube 104. The bead 117 spaces the disc 107 from a magnetizable disc 119 which is in contact with the tube 104. The tube 115 supports a magnetizable armature 120 connected by a screw stud 121 and a pin 122 with a link 123 having a slot 124 receiving a pin 125 carried by a lever arm 126 having a hub 127 pinned to a shaft 128 journaled in a bracket 129 integral with end frame 25. Hub 127 is integral with a lever arm 130 carrying a pad 131 for engaging the thimble 89 on the left end of rod 80.

The armature 120 is supported by the tube 115 for sliding movement, but the armature 120 does not rotate since it is provided with a groove 133 engaged by a tongue 134 integral with the disc 107. The tube 115 is provided with a notch 135 to provide clearance for the tongue 134. In order to exclude foreign matter from the interior of the tube 115, the armature carries a felt ring 136 which is retained by a resilient split ring washer 137 which is retained by the flange 138 provided at the right end of armature 120. Ring 136 bears against the interior of tube 115.

The electromagnet includes an armature attracting coil 140 and an armature holding coil 141. Initially both coils are excited in order to attract the armature 120 toward the core 101. Movement of the armature 120 toward the left effects the closing of the motor switch to be described and also the short circuiting of the main attracting coil 140 leaving the coil 141 in circuit to maintain the closure of the starting motor switch and the engagement of the jaw clutch 41 with its companion clutch member.

The motor switch includes a pair of spaced contacts one of which is shown at 144. These contacts are provided by the ends of terminal screws 145 (only one shown) insulatingly supported by a plate 146 attached by screws 147 to a switch housing 148 which encloses not only the switch but the terminals and connections between these terminals and the electric motor. Housing 148 is shaped to conform to the cylindrical surface of the starting motor and is provided with a removable cover 149 secured by screws 150. The contacts 144 are engaged by a contact disc 151 insulatingly supported by nonconducting sleeve 152 which is slidable on a rod 153 which is attached at its right end to the armature 120 and which slides through a central hole in the core 101. The left end of the rod 153 carries a nut 155. The sleeve 152 is normally urged against the nut 155 by a spring 156 bearing at its left end against a washer 157 which bears against the sleeve 152. Spring 156 bears at its right end against the C-washer 158 received by a groove 159 in the rod 153. One of the contact screw terminals 145 is connected by a cable with the current source the other contact terminal screw 145 is connected by a strap 160 with certain brushes not shown. Other brushes are connected with one end of the field circuit. The other end of the field circuit is connected by wire 161 with a terminal bolt 162. Therefore when the two contacts 144 are bridged by the contact disc 151, the electric motor 20 will be connected with a current source and will operate through the gears to turn the shiftable driving member 40 in order to crank the engine.

The electromagnet 100 is controlled by a push button switch (not shown) located near the driver of the vehicle which is equipped with this engine starter. The closing of the switch causes the electromagnet 100 to operate to shift the jaw clutch 41 into engagement with a similar jaw clutch on the engine to be started and also to cause the disc 151 to bridge the switch contacts 144 in order to cause the motor 20 to rotate the jaw clutch 41. When the engine becomes self-operative its jaw clutch runs ahead of the jaw clutch 41 which is caused to snap back and forth under the action of the spring 83. When the push button starter control switch is released, the electromagnet is deenergized and spring 87 causes the jaw clutch 41, the armature 120 and the switch disc 151 to be returned to normal position.

The frame 148 includes an end wall 148a which is secured to disc 103 of electromagnet 100. Frame 148 supports a nonconducting tube 148b which cooperates with end wall 148a and disc 146 to enclose the starting motor switch.

The left end of starting motor armature shaft 30 is provided with a square portion 30a for receiving a removable crank by which the shaft 30 may be turned manually in event of failure of the current source.

While the embodiment of the present invention as herein disclosed, constitutes a preferred form, it is to be understood that other forms might be adopted, all coming within the scope of the claims which follow.

What is claimed is as follows:

1. An engine starter comprising an electric motor having a field frame, an armature shaft and end frames attached to the field frame and carrying bearings which support the shaft, a gear housing attached to one of the end frames of the motor, a tubular shaft supported by the housing, speed-reduction gearing in the gear housing for connecting the armature shaft with the tubular shaft, a driving member for making engagement with a shaft of the engine to be started, said member being supported by the tubular shaft centrally thereof, means provided by the tubular shaft and member for drivingly connecting said shaft and member while providing for longitudinal movement of the member into and out of connection with the engine shaft, means for effecting longitudinal movement of the member and including a rod extending through the tubular shaft and into the gear housing and including an electromagnet having an armature and mounted upon the motor field frame and a device located in the gear housing for transmitting motion from the armature of the electromagnet to said rod, and a motor switch supported by the motor field frame and closed by the armature of the electromagnet as the latter is moved to operate said rod and cause engagement of said driving member with the engine shaft.

2. An engine starter comprising an electric motor, a tubular shaft driven by the motor, a driving member for making engagement with a shaft of the engine to be started, said member being supported by the tubular shaft centrally thereof, means provided by the shaft and member for drivingly connecting the shaft and member while providing for longitudinal movement of the member into and out of engagement with the engine shaft, a rod extending through the shaft and member, a spring within the shaft for maintaining the rod in a normal position relative to the shaft, a second spring within the shaft for transmitting motion yieldingly from the rod to the member in a direction to move the member into driving engagement with the engine shaft, a part carried by the rod and engaging the member to retract it from the engine shaft when the rod returns to normal position under the action of the first spring, means for moving the rod away from normal position in a direction toward the engine shaft, the tubular shaft being provided internally with longitudinal splines and the driving member being provided externally with longitudinal splines engaging the splines of the shaft, and a part attached to the rod provided externally with longitudinal splines also engaging the splines of the shaft, whereby the rod rotates with the shaft, and rotation of the rod relative to the springs is prevented.

3. An engine starter comprising an electric motor, a tubular shaft driven by the electric motor and provided intermediate the ends of its central bore with an apertured partition providing an internal annular flange and provided with internal longitudinal splines extending from the annular flange to the end of the shaft nearest to a shaft of the engine to be started, a driving member for making engagement with the engine shaft and supported by the shaft centrally thereof and having longitudinal splines engaging the splines of the shaft, a rod extending through the shaft and member, a part attached to the rod and having splines engaging the splines of the shaft, a spring located within the shaft and between the annular flange and the end of the shaft remote from the driving member, means operatively connecting the spring with the rod so that the rod is urged away from the engine shaft and the rod-part attached to the rod normally bears against the annular flange on the side thereof nearest to the connecting member, a spring located between said rod-part and the connecting member to transmit motion yieldingly from the rod to the connecting member in a direction to move it into engagement with the engine shaft, a second part attached to the end of the rod adjacent to the connecting member for establishing the normal position of the connecting member relative to the rod and for retracting the member from the engine shaft when the rod returns to normal position under the action of the first spring, and means for moving the rod away from normal position in a direction toward the engine shaft.

HERBAL A. THORNBURG.